(12) United States Patent
Sugahara

(10) Patent No.: US 8,855,623 B2
(45) Date of Patent: Oct. 7, 2014

(54) RADIO WAVE STATE MEASUREMENT SYSTEM, RADIO WAVE STATE MEASUREMENT METHOD, AND STORAGE MEDIUM STORING RADIO WAVE STATE MEASUREMENT PROGRAM

(75) Inventor: Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 156 days.

(21) Appl. No.: 13/255,472

(22) PCT Filed: Feb. 8, 2010

(86) PCT No.: PCT/JP2010/000749
§ 371 (c)(1),
(2), (4) Date: Sep. 8, 2011

(87) PCT Pub. No.: WO2010/113379
PCT Pub. Date: Oct. 7, 2010

(65) Prior Publication Data
US 2012/0003979 A1    Jan. 5, 2012

(30) Foreign Application Priority Data
Mar. 31, 2009   (JP) ................................ 2009-085802

(51) Int. Cl.
*H04W 4/00* (2009.01)
*H04W 24/10* (2009.01)
*H04W 28/18* (2009.01)
*H04W 88/08* (2009.01)

(52) U.S. Cl.
CPC .............. *H04W 24/10* (2013.01); *H04W 28/18* (2013.01); *H04W 88/08* (2013.01)
USPC ..... 455/422.1; 455/352; 455/424; 455/456.5; 455/507; 455/567

(58) Field of Classification Search
CPC ..... H04W 24/02; H04W 24/10; H04W 24/00; H04W 24/08; H04W 52/0216; H04W 24/04

USPC ................................................ 455/422.1, 507
See application file for complete search history.

(56) References Cited

U.S. PATENT DOCUMENTS

| | | | |
|---|---|---|---|
| 7,509,097 B2 * | 3/2009 | Irie et al. ..................... | 455/67.13 |
| 2002/0098839 A1 * | 7/2002 | Ogino et al. .................. | 455/424 |
| 2003/0050080 A1 * | 3/2003 | Uchimura ..................... | 455/466 |
| 2006/0217104 A1 * | 9/2006 | Cho ............................. | 455/352 |
| 2006/0217142 A1 * | 9/2006 | Inaba ........................... | 455/522 |

(Continued)

FOREIGN PATENT DOCUMENTS

| JP | 2003-204296 A | 7/2003 |
|---|---|---|
| JP | 2004-170203 A | 6/2004 |

(Continued)

OTHER PUBLICATIONS

Matsumoto Kazuhiko, "Radio wave condition measuring system in mobile object communication network and radio wave condition measuring method", Jul. 18, 2003, JP 2003204296 A, Machine Translation.*

(Continued)

*Primary Examiner* — Liton Miah
(74) *Attorney, Agent, or Firm* — Sughrue Mion, PLLC

(57) ABSTRACT

A propagation state measurement system includes a parameter update information reception means (101) and a measurement control means (102). The parameter update information reception means (101) stores a time when a radio parameter of a base station (30*a*) is updated. The measurement control means (102) indicates measurement of a radio wave state to a mobile terminal (40*a*) that can communicate with the base station (30*a*) at a timing determined according to the time stored by the parameter update information reception means (101). Then, when the radio parameter of the base station (30*a*) of a mobile communication system is updated, a change of the radio wave state by the radio parameter update is quickly and efficiently measured.

16 Claims, 9 Drawing Sheets

(56) References Cited

U.S. PATENT DOCUMENTS

| | | | |
|---|---|---|---|
| 2008/0130584 A1* | 6/2008 | Pani et al. | 370/332 |
| 2008/0183798 A1* | 7/2008 | Sekine | 709/201 |
| 2008/0273479 A1* | 11/2008 | Kwak et al. | 370/311 |
| 2008/0318566 A1* | 12/2008 | Chun et al. | 455/422.1 |

FOREIGN PATENT DOCUMENTS

| | | | |
|---|---|---|---|
| JP | 2005-223732 A | 8/2005 | |
| JP | 2007-266906 A | 10/2007 | |

OTHER PUBLICATIONS

Masaharu Hata, "Empirical Formula for Propagation Loss in Land Mobile Radio Services", IEEE Transactions on Vehicular Technology, Aug. 1980, pp. 317-325, vol. 29, No. 3.

Thomas Kürner, et al., "Concepts and Results for 3D Digital Terrain-Based Wave Propagation Models: An Overview", IEEE Journal on Selected Areas in Communications, Sep. 1993, pp. 1002-1012, vol. 11, No. 7.

* cited by examiner

RADIO WAVE STATE MEASUREMENT SYSTEM, RADIO WAVE STATE MEASUREMENT METHOD, AND STORAGE MEDIUM STORING RADIO WAVE STATE MEASUREMENT PROGRAM

CROSS REFERENCE TO RELATED APPLICATIONS

This application is a National Stage of International Application No. PCT/JP2010/000749 filed Feb. 8, 2010, claiming priority based on Japanese Patent Application No. 2009-085802 filed Mar. 31, 2009, the contents of all of which are incorporated herein by reference in their entirety.

TECHNICAL FIELD

The present invention relates to a system, a method, and a storage medium storing a program that measures a radio wave state of a service area using information of radio waves measured by a mobile terminal in a mobile communication system such as a mobile phone.

BACKGROUND

In the mobile communication system including a mobile phone, a radio wave state between a base station and a mobile terminal is influenced by an environment of an object such as buildings, vegetation, and cars, and usage frequency of the system. Therefore, a designer of a wireless network needs to perform measurements in order to appropriately grasp the radio wave state of the service area when a large change is caused in the state of the building or when a large change is caused in the number of users and traffic. Moreover, even when a detectable change as above is not recognized, it is preferable to periodically measure the radio wave state.

The measurement of the radio wave state is performed by using a measurement vehicle mounted with an antenna and a measurer for measuring receiving field intensity and a GPS (Global Positioning System) for measuring the current position, and driving within a measurement area. Such measurement requires approximately one to two days even when measuring an area of a few square km as a measurement team goes the site and drives on roads in the measurement area in a meshed manner. Further, the measurement team requires a navigator to guide a driving route and an engineer who operates the measurer besides a driver who drives the measurement vehicle. Therefore, in the measurement of the radio wave state by the measurement vehicle, there has been a problem to be solved that it requires high personal expenses.

In order to solve such problem, PTL 1 discloses a system that measures the radio wave state of the service area using radio wave information reported from a mobile terminal such as a mobile phone terminal used by a general user. This system has a function that indicates the measurement area and measurement time to perform radio wave measurement to a mobile communication network, calculates electric field intensity distribution for different areas and time zones using reception level data or the like transmitted from the mobile terminal, and displays it on a map.

In such radio wave measurement using the mobile terminal, when performing measurement at a high frequency such as every minute to all the mobile terminals, the information to be reported will be enormous besides that the power consumption of the terminal increases, thus the process will be difficult. Accordingly there has been attempts to solve such problem by limiting an area and time to perform the measurement. For example, in the radio wave state measurement system disclosed in PTL 1, by connecting a weather information system, a network monitoring system, and a traffic measurement system, it is possible to grasp the state of radio waves at the time when a change of the weather state or an equipment failure is caused. Moreover, in a weather forecast server disclosed in PTL 2, by searching for a mobile phone placed in an area which runs short of weather information and receiving the weather information from the mobile phone, efficient collection of the weather information is performed.

CITATION LIST

Patent Literature

PTL 1: Japanese Unexamined Patent Application Publication No. 2003-204296
PTL 2: Japanese Unexamined Patent Application Publication No. 2004-170203
PTL 3: Japanese Unexamined Patent Application Publication No. 2005-223732

Non Patent Literature

NPL 1: M. Hata, "Empirical formula for propagation loss in land mobile radio services," IEEE Transactions on Vehicular Technology, vol. 29, no. 3, pp. 317-325, August 1980.
NPL 2: T. Kurner, "Concepts and results for 3D digital terrain-based wave propagation models: an overview," IEEE Journal on Selected Areas in Communications, vol. 11, no. 7, pp. 1002-1012, September 1993.

SUMMARY OF INVENTION

Technical Problem

On the other hand, in the mobile communication system such as a mobile phone, in order to deal with construction and demolition of buildings, and an increase of the number of users, radio parameters such as transmission power, antenna tilt, a hand-over threshold, and an adjacent cell list of the base station are adjusted. Further, when running a new base station, in order to optimize communication quality of the service area, the radio parameters of a peripheral base station are adjusted. A designer of the wireless network wants to promptly grasp how the radio wave state of the service area has changed since before the update at the time of such radio parameter update. Then, when remarkable deterioration or the like is confirmed, a countermeasure, such as returning to the state before updating the radio parameter can be implemented.

However, with neither of the techniques of the abovementioned PTL 1 and 2, since an indication of the measurement area and time relevant to the update of the radio parameter has not been given, it is not possible to efficiently measure the change of the radio wave state by the radio parameter update. Thus, in the abovementioned technique relevant to the present invention, there has been a problem that it is not possible to efficiently measure the change of the radio wave state by the radio parameter update at the time of the update of the radio parameter of the base station in the mobile communication network.

The present invention is made to solve the abovementioned problem, and aims to provide a radio wave state measurement system, a radio wave state measurement method, and a storage medium storing a radio wave state measurement program for quickly and efficiently measuring the change of the radio wave state by the update of the radio parameter at the time of update of the radio parameter of the base station in the mobile communication network.

Solution to Problem

A radio wave state measurement system according to a first aspect of an illustrative embodiment includes a means for storing a time when a radio parameter of a base station is updated, and a means for indicating measurement of a radio wave state to a mobile terminal that can communicate with the base station at a timing determined according to the time.

A radio wave state measurement method according to a second aspect of an illustrative embodiment includes indicating to measure a radio wave state to a mobile terminal that can communicate with a base station at a timing determined according to a time when a radio parameter of the base station is updated.

A storage medium storing a radio wave state measurement program according to a third aspect of an illustrative embodiment is a recording medium storing a program causing a computer to execute a control process to indicate measurement of a radio wave state to a mobile terminal that can communicate with the base station at a timing determined according to a time when a radio parameter of the base station is updated.

Advantageous Effects of Invention

According to an illustrative embodiment, it is possible to provide a radio wave state measurement system, a radio wave state measurement method, and a storage medium storing a radio wave state measurement program for quickly and efficiently measuring the change of the radio wave state by the update of the radio parameter at the time of the update of the radio parameter of the base station in the mobile communication network.

DESCRIPTION OF EMBODIMENTS

First Illustrative Embodiment

Figure 1:
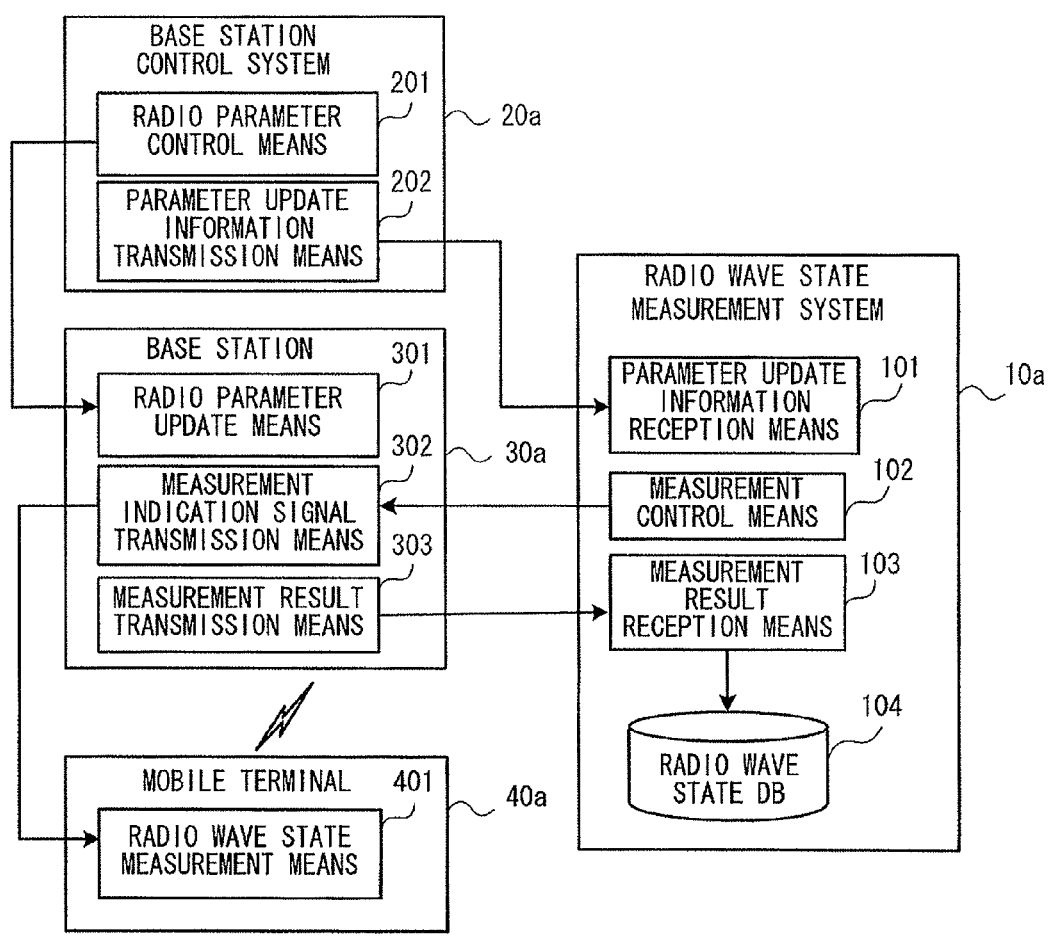
FIG. 1 is an entire block diagram for explaining a first illustrative embodiment.

Next, illustrative embodiments are described in detail with reference to the drawings. FIG. 1 is an entire block diagram showing a first illustrative embodiment of the present invention. As for 10a, it shows a radio wave state measurement system, 20a shows a base station control system, 30a shows a base station, and 40a shows a mobile terminal. The radio wave state measurement system 10a, the base station control system 20a, and the base station 30a are a collection of logical functions, and physically, these three elements can be individually implemented or two or three elements among the three elements are integrated to be configured and implemented. Hereinafter, a radio state measurement system and a radio state measurement method by this radio state measurement system according to the first illustrative embodiment of the present invention are explained with reference to FIGS. 1 to 4.

The radio wave state measurement system 10a is a radio wave state measurement system targeted by the present invention, and is a system for measuring the radio wave state of a service area using the information of radio waves measured by a mobile terminal. This system is composed including a parameter update information reception means 101, a measurement control means 102, a measurement result reception means 103, and a radio wave state database (DB) 104. The parameter update information reception means 101 has a function for receiving radio parameter update information transmitted from the parameter update information transmission means 202 of the base station control system 20a. The parameter update information reception means 101 has a recording medium (a memory, a hard disk, etc.) which stores the received radio parameter update information.

Here, the radio parameter update information is information concerning the update of the radio parameter of the base station, and includes an identification number of the base station to be updated, a type of the radio parameter to be updated, a value of the radio parameter before update and after update, and date and time when the radio parameter is update or the like. According to this illustrative embodiment, at least the identification number of the base station to be updated and update date and time are included. Note that when the base station is sectorized, identification information of the sector is required in addition to the identification number of the base station.

In addition, targets of the radio parameter of the base station are total transmission power, common pilot channel transmission power, and a direction of an antenna, an angle of attack of the antenna, an adjacent cell list, and a hand-over threshold, etc. of the base station.

The measurement control means 102 has a function for indicating a start and stop of the measurement of the radio wave state to a measurement indication signal transmission means 302 of the base station 30a according to on the radio parameter update information received by the parameter update information reception means 101. The indication of the start and stop of the measurement is given by referring to the update date and time of the radio parameter. Specific operation thereof is mentioned in detail in the following explanation of the operation. The measurement result reception means 103 receives the measurement result of the radio wave state transmitted from a measurement result transmission means 303 of the base station 30a, and has a function for storing it to the radio wave state DB 104. The radio wave state DB 104 is a database for storing the measurement result of the radio wave state received by the measurement result reception means 103.

The base station control system 20a is a system for controlling the radio parameter of the base station 30a, and is composed including a radio parameter control means 201 and the parameter update information transmission means 202. The radio parameter control means 201 includes a function for controlling the update of the radio parameter of the base station 30a, and transmits radio parameter control information to the parameter update information transmission means 202 and a radio parameter update means 301. The radio parameter update information of the base station 30a is manually input to the radio parameter control means 201 beforehand, or is transmitted as data from other devices, and is stored to a recording medium within the radio parameter control means 201. The radio parameter control information includes the radio parameter update information. The parameter update information transmission means 202 receives the radio parameter control information from the radio parameter control means 201, and transmits the radio parameter update information of the base station 30a included in the radio parameter control information to the parameter update information reception means 101.

The base station 30a is a base station of a mobile communication system targeted by the present invention, and is composed including the radio parameter update means 301, the measurement indication signal transmission means 302, and the measurement result transmission means 303. The radio parameter update means 301 updates the radio parameter of the base station 30a according to the radio parameter control information transmitted from the radio parameter control means 201 of the base station control system 20a. The update of the radio parameter by the radio parameter update means 301 can be automatically performed when the radio parameter control information is transmitted from the radio parameter control means 201 or can be manually performed when the radio parameter control information is received after confirming the reception.

The measurement indication signal transmission means 302 receives a measurement control signal transmitted from the measurement control means 102 of the radio wave state measurement system 10a, and transmits the measurement instruction signal which indicates a start and stop of the measurement of the radio wave state to the mobile terminal 40a according to the measurement control signal. Here, the data of the radio wave state which can be measured is radio wave data such as reception signal electric power, a signal-to-noise ratio (SIR), Ec/No, a delay profile, a delay spread, and a signal arrival direction, and the radio wave state measurement system 10a measures at least one of this radio wave data. The measurement result transmission means 303 includes a function for transmitting a measurement result of the radio wave state reported from the mobile terminal 40a to the measurement result reception means 103 of the radio wave state measurement system 10a. Note that the identification number of the transmitting base station is included in the measurement result of the abovementioned radio wave state in addition to the radio wave data.

The mobile terminal 40a is a mobile terminal of the mobile communication system targeted by the present invention, and is a mobile terminal connected to the base station 30a. This terminal is composed including a radio wave state measurement means 401. The radio wave state measurement means 401 has a function to receive the measurement indication signal transmitted from the measurement indication signal transmission means 302 of the base station 30a. The radio wave state measurement means 401 also has a function of reporting to the base station 30a data obtained by the measurement of the received radio wave, added with the identification number of the transmitting base station, as the measurement result, while measuring the radio wave state concerning received radio waves according to the measurement indication signal. Since the functions of the base station control system 20a, the base station 30a, and the mobile terminal 40a other than above are well known to a person skilled in the art, specific explanation is omitted.

(Explanation of an Operation of the First Illustrative Embodiment)

Figure 2:
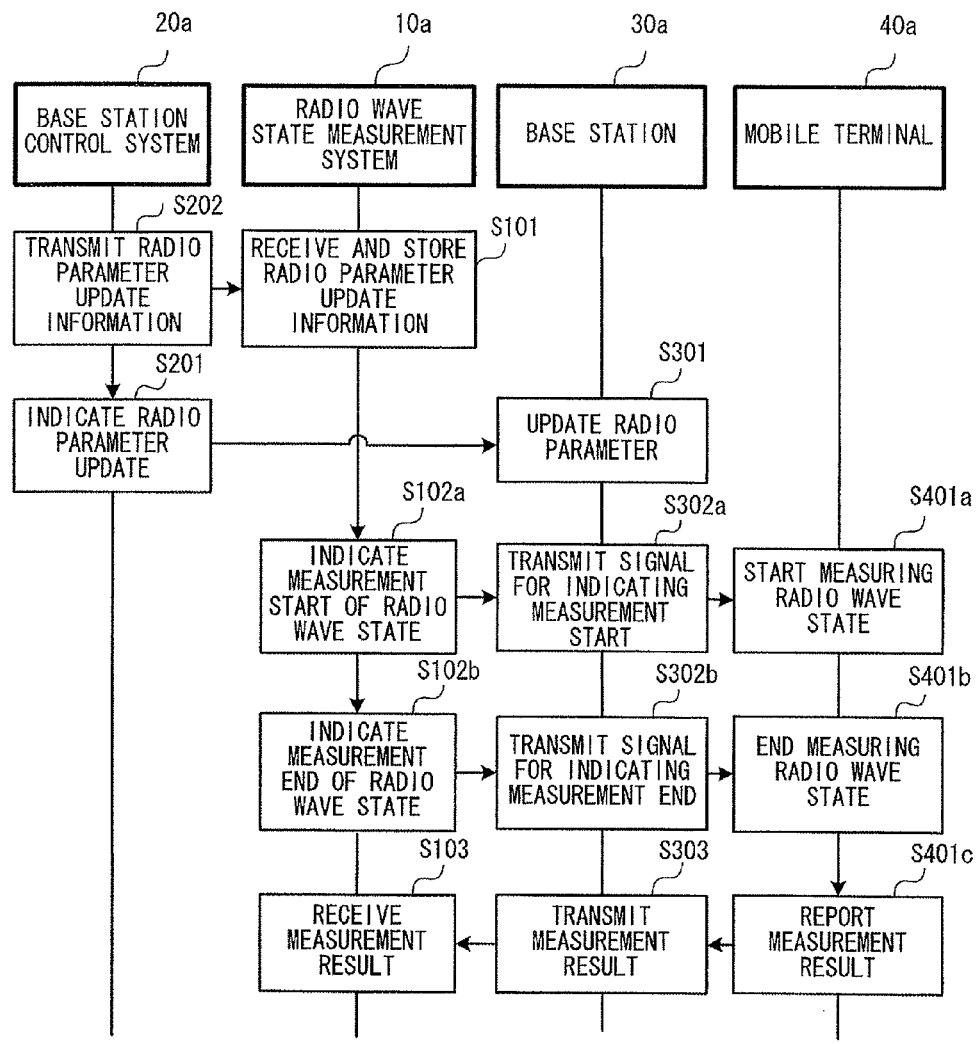
FIG. 2 is a flowchart for explaining an operation of the first illustrative embodiment.

FIG. 2 is a flowchart showing the operation of the abovementioned first illustrative embodiment of the present invention in which its operation is explained with reference to FIG. 1. In FIG. 2, each sequence following the base station control system 20a, the radio wave state measurement system 10a, the base station 30a, and the mobile terminal 40a represents the operation in the system.

First, along with that the radio parameter update of the base station 30a is determined by the radio parameter control means 201 of the base station control system 20a, the parameter update information transmission means 202 of the base station control system 20a transmits the radio parameter update information including the identification number of the base station 30a to be update and the update date and time (step S202). The parameter update information reception means 101 of the radio wave state measurement system 10a receives the radio parameter update information, and stores it to the recording medium (step S101).

Next, the radio parameter control information is transmitted to the radio parameter update means 301 of the base station 30a from the radio parameter control means 201 of the base station control system 20a, and the update of the radio parameter is instructed (step S201). In response to the instruction, the radio parameter update means 301 of the base station 30a performs the update of the radio parameter in accordance with the radio parameter update information included in the radio parameter control information (step S301). The measurement control means 102 of the radio wave state measurement system 10a refers to the update date and time of the radio parameter update information stored to the recording medium of the parameter update information reception means 101, transmits the measurement control signal to the measurement indication signal transmission means 302 of the base station 30a at the update date and time, and indicates a measurement start of the radio wave state (step S102a). The timing when the measurement control means 102 of the radio wave state measurement system 10a transmits the measurement control signal to the measurement indication signal transmission means 302 of the base station 30a is configured to be immediately after completion of the update of the radio parameter by the radio parameter update means 301 in the base station 30a.

The base station 30a transmits the measurement indication signal for indicating the measurement start of the radio wave state to the mobile terminal 40a which is connected to the base station 30a according to the indication of the measurement start of the radio wave state by the measurement control signal (step S302a). The mobile terminal 40a receives the measurement indication signal and starts measuring according to the indication (step S401a). After sufficient measurement period to grasp the radio wave characteristics of the area has elapsed, the radio wave state measurement system 10a transmits the measurement control signal from the measurement control means 102 to the measurement indication signal transmission means 302, and indicates a measurement end to the base station 30a (step S102b). Here, as an example, the sufficient measurement period to grasp the radio wave characteristics of the area is the period until the measurement is completed in at least one position in a mesh of 50% when the coverage area of the base station is divided into a mesh of 10 m interval. The base station 30a transmits the measurement instruction signal for instructing the measurement end to the mobile terminal 40a, which is connected to the base station 30a, according to the instruction of this measurement end (step S302b). The mobile terminal 40a receives the measurement indication signal, ends the measurement according to the indication (step S401b), and reports the measurement result to the base station 30a (step S401c). The base station 30a transmits the measurement result of the radio wave state reported from the mobile terminal 40a to the radio wave state measurement system 10a by the measurement result transmission means 303 (step S303). The radio wave state measurement system 10a receives the measurement result by the measurement result reception means 103, and stores the received measurement result to the radio wave state DB 104 (step S103).

The operation which performs the measurement start (step S102a) of the radio wave state immediately after updating the radio parameter is explained in the flowchart of FIG. 2. Here, it is assumed that the radio wave state before updating the radio parameter is already obtained by stationary measurement. By comparing the already obtained radio wave state before update and the measured radio wave state after update, it is possible to grasp an area with improved, an area with deteriorated, and an area with a small change of the radio wave state.

On the other hand, it can be also considered that the radio wave state before updating the radio parameter has not been obtained. Otherwise, even when it is obtained, if the measurement date and time is away from the measurement date and time of the radio wave state after updating the radio parameter, it is not possible to compare the radio wave state before update with the radio wave state after update due to fluctuation elements (for example, a building, a person, or a fluctuation of density) other than the radio parameter. In such a case, it is preferable to measure the radio wave state before update not only the radio wave state after update.

Figure 3A:
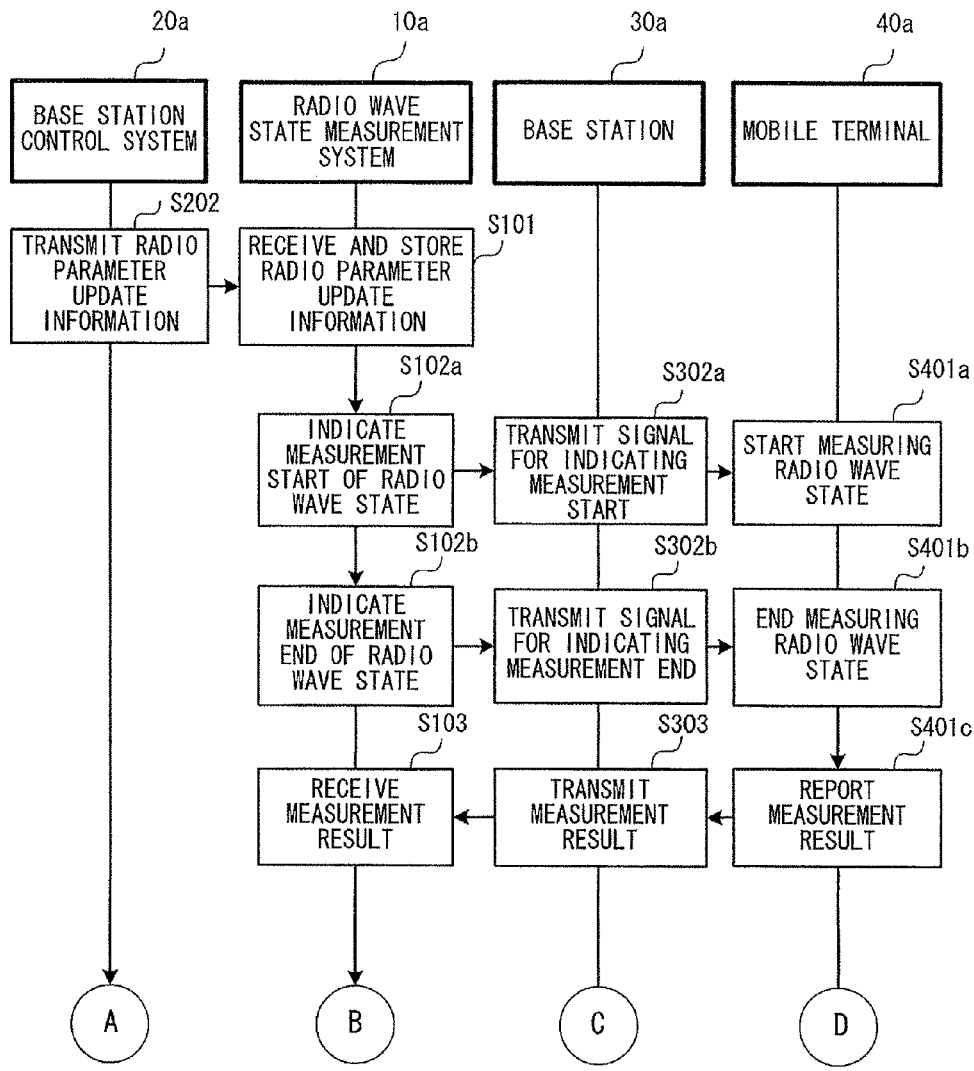
FIG. 3A is a flowchart for explaining another operation of the first illustrative embodiment.
Figure 3B:
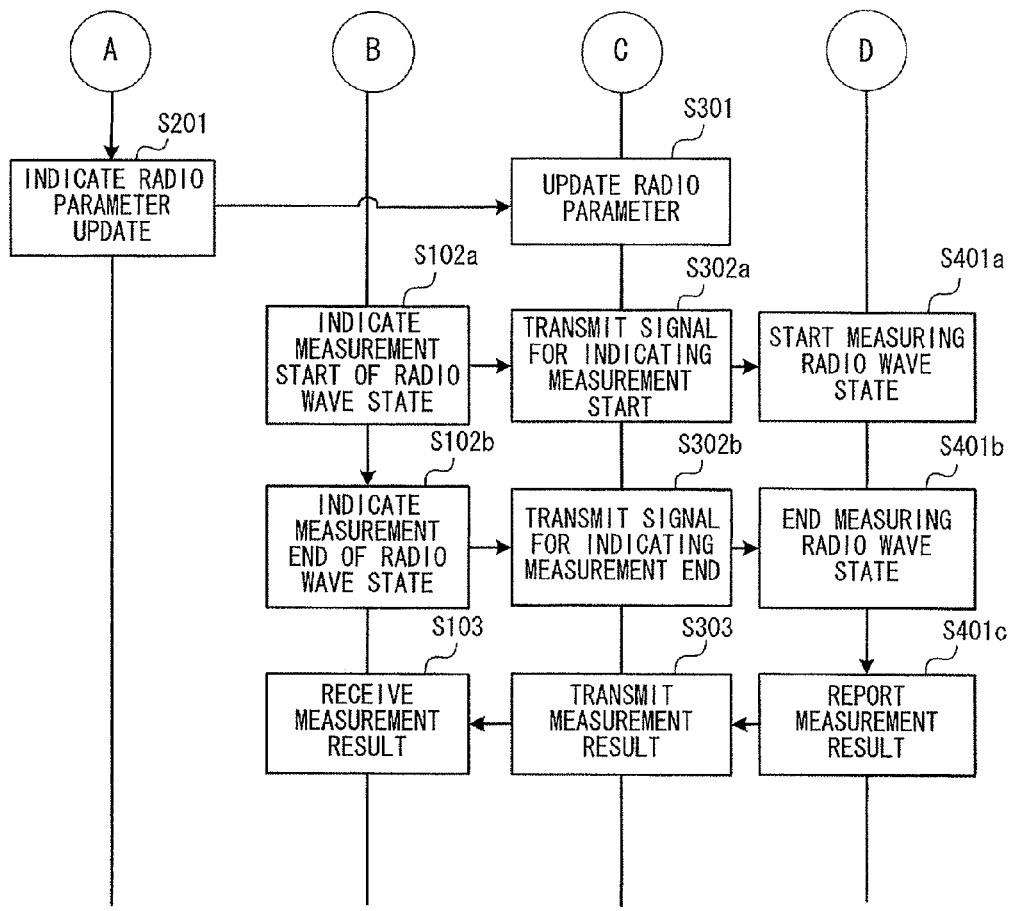
FIG. 3B is a flowchart for explaining another operation of the first illustrative embodiment.

FIGS. 3A and 3B are flowcharts showing other operations of the first illustrative embodiment with the configuration thereof shown in FIG. 1. In this operation, the process from the indication (step S102a) of the measurement start by the radio wave state measurement system 10a to the reception of the measurement result and the storage to the radio wave state DB 104 (step S103) is performed not only after the radio parameter of the base station 30a is actually updated, but also before update. Accordingly, while the indication of the measurement start of the radio wave state by the first step S102a in FIG. 3A is performed immediately before the date and time of the radio parameter update notified by the radio parameter update information received in the step S101, the indication of the measurement start of the radio wave state by the second step S102a in FIG. 3B is performed immediately after the date and time of the radio parameter update notified by the radio parameter update information received in the step S101. Then, it is possible to compare the radio wave state immediately before the radio parameter update and immediately after update, and perform comparison that is not subject to fluctuation elements other than the radio parameter.

Figure 4:
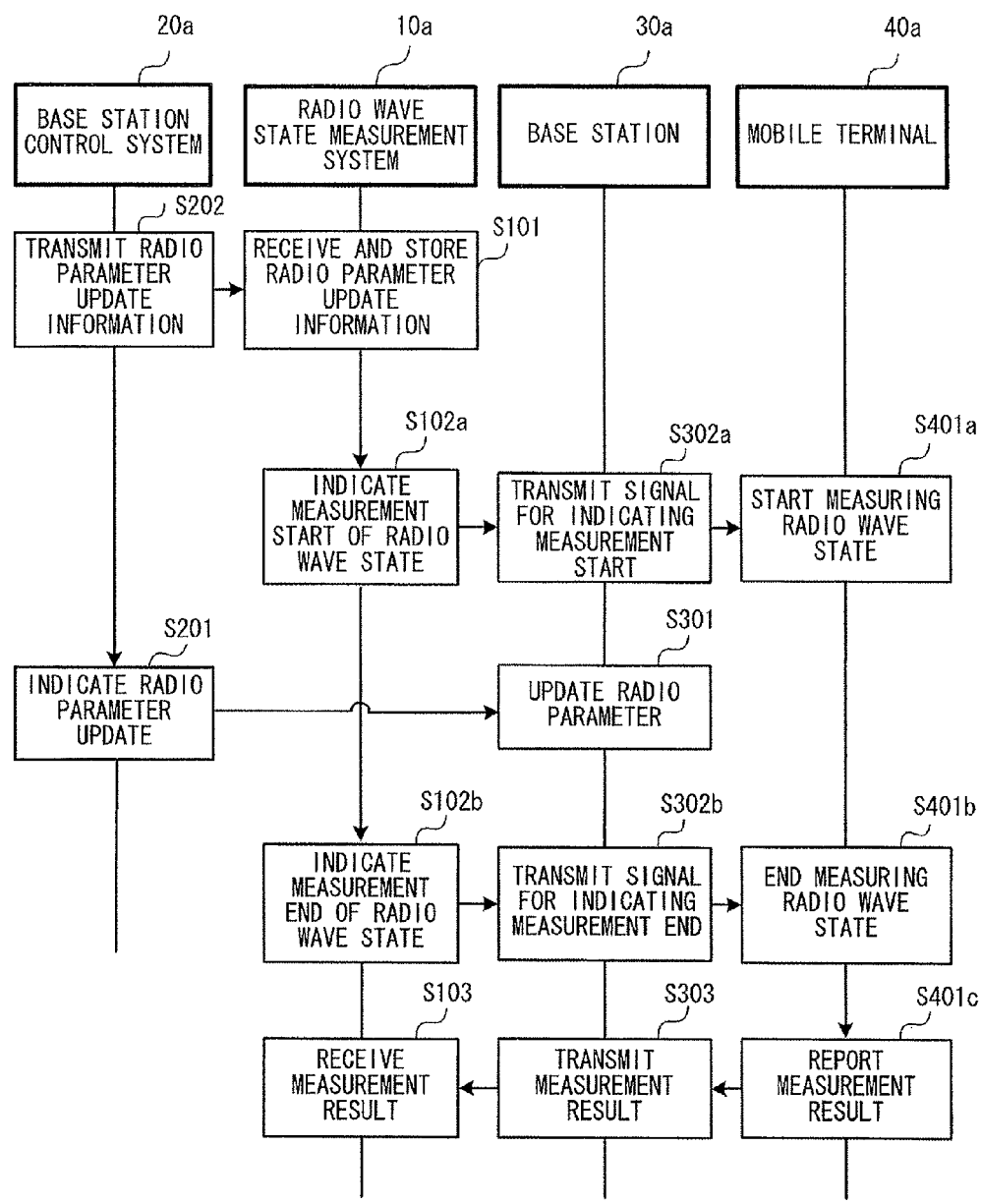
FIG. 4 is a flowchart for explaining yet another operation of the first illustrative embodiment.

FIG. 4 is a flowchart showing yet another operation of the first illustrative embodiment with the configuration thereof shown in FIG. 1. In the operation shown in the flowchart, the date and time of the radio parameter update notified by the radio parameter update information received in the step S101 is referred, the indication (step S102a) of the measurement start by the radio wave state measurement system 10a and the accompanying transmission (step S302a) of the measurement indication signal by the base station 30a is performed before the radio parameter of the base station 30a is actually updated, and after the radio parameter of the base station 30a is updated, the indication (step S102b) of the measurement end of the radio wave state measurement system 10a and the accompanying transmission (step S302b) of the measurement indication signal by the base station is performed.

The mobile terminal 40a which received the transmission of the measurement indication signal generates the information which is the radio wave data obtained by the measurement of received radio wave added with information of the measurement time as the measurement result of the radio wave state, and transmits it to the base station 30a. On the other hand, in the radio wave state measurement system 10a, the parameter update information reception means 101 receives the radio parameter update information in the step S101, and stores the date and time of the radio parameter update included in the radio parameter update information. Therefore, the measurement result reception means 103 of the radio wave state measurement system 10a compares the radio parameter update date and time stored to the parameter update information reception means 101 with the measurement time of the measurement result of the radio wave state received from the base station 30a, recognizes the radio wave state of the measurement result at the measurement time before the radio parameter update as the radio wave state before the radio wave parameter update, and recognizes the radio wave state of the measurement result at the measurement time after the radio parameter update time as the radio wave state after the radio parameter update. In this way, also in the operation shown in the flowchart of FIG. 4, the radio wave state of the measurement result can be categorized into the data immediately before the radio parameter update and the data immediately after update. Therefore, it becomes possible to compare the radio wave state immediately before the radio parameter update and the radio wave state immediately before update and compare the radio wave state that is not subject to the fluctuation elements other than the radio parameter.

Note that in the illustrative embodiment of FIG. 1, it is the configuration to measure the radio wave state of the base station 30a in which the radio parameter thereof is to be updated. However, it is preferable to perform the measurement of the radio wave state for the area of a certain size or more. When the mobile terminal which is to be instructed for the measurement of the radio wave state is limited to the mobile terminal connected to the base station 30a, the radio wave state may not be measured in a wide area of a necessary size. In such a case, when at least the base station 30a with updated radio parameter is included, similar measurement can be performed to the other base station. For example, the similar measurement as this illustrative embodiment can be indicated to the base station within a predetermined range from the base station 30a or the base station registered as an adjacent cell of the base station 30a, and the radio wave state can be measured by the mobile terminals connected to those base stations. This also applies to the following illustrative embodiments.

Although the illustrative embodiment of FIG. 1 showed the operation which individually indicates the start (step S102a) and end (step S102b) of the measurement from the radio wave state system 10a to the base station 30a, the present invention is not limited to this. For example, the instruction to the base station 30a from the radio wave state measurement system 10a shall be only once, and the time to start and end the measurement is provided at that time. Then, the base station 30a can store the time of start and end of the measurement and can perform the start and end of the measurement according to both times. Moreover, even when transmitting the measurement instruction signal from the base station 30a to the mobile terminal 40a, the transmission can be only once, the time to start and end the measurement can be provided at that time, and the mobile terminal 40*a* can store both times and can perform an operation to start and end the measurement according to the both times. This also applies to the following illustrative embodiments.

Additionally, although this illustrative embodiment showed the operation which performs the report (step S303) of the measurement result from the base station 30*a* after the measurement is completed, the present invention is not limited to this. For example, an operation to report at a certain time interval can be adopted during the measurement. Further, in the radio wave state measurement system 10*a*, an operation can be adopted to indicate the end of the measurement (step S102*b*) at the time when analyzing the measurement result reported at the certain time interval and obtaining sufficient measurement result to grasp the radio wave state. This also applies to the following illustrative embodiments.

Furthermore in this illustrative embodiment, although the radio wave state measurement system 10*a* and the base station control system 20*a* are different systems, it can be a configuration in which both functions are stored to the same system. This also applies to the following illustrative embodiments.

As explained above, in this illustrative embodiment with the configuration thereof shown in FIG. 1, the radio parameter update time of the base station 30*a* is stored. Therefore, since it is possible to refer to the stored radio parameter update time and issue an indication for radio wave state measurement when indicating the measurement of the radio wave state to the mobile terminal 40*a*, the radio wave state can be measured at least immediately after the radio parameter update and quickly and efficiently measure the change of the radio wave state by the radio parameter update.

Second Illustrative Embodiment

Figure 5:
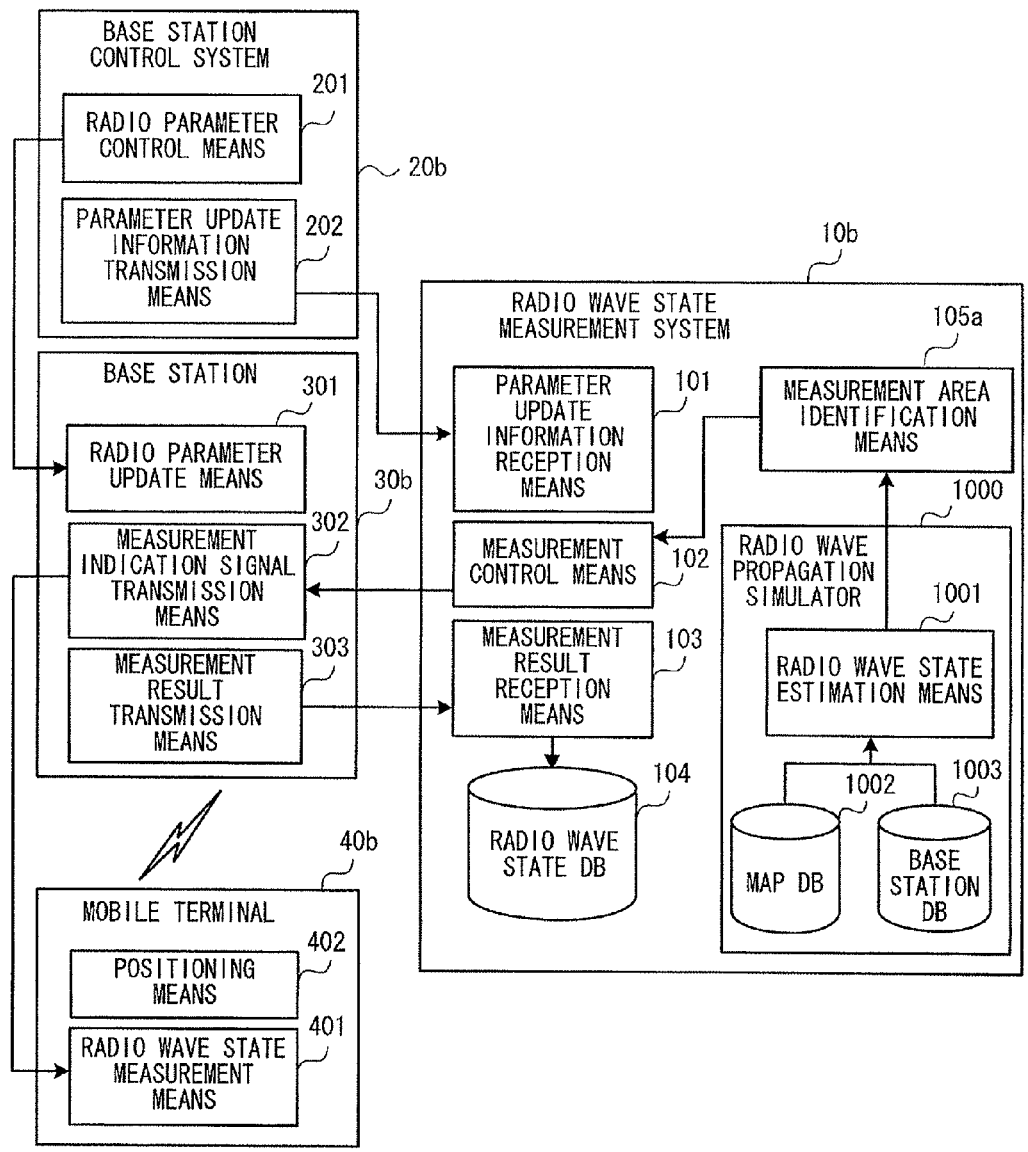
FIG. 5 is an entire block diagram for explaining a second illustrative embodiment.

FIG. 5 is an entire block diagram showing a second illustrative embodiment of the present invention. As for 10*b*, a radio wave state measurement system is shown, and 20*b* shows a base station control system, 30*b* shows a base station, and 40*b* shows a mobile terminal. The explanation of the differences from the first illustrative embodiment is focused here. Hereinafter, a radio wave state measurement system and a radio wave state measurement method by this radio wave state measurement system, which are the second illustrative embodiment of the present invention, are explained with reference to FIGS. 5 and 6.

The radio wave state measurement system 10*b* is a system targeted by the present invention, and is a system for measuring the radio wave state of a service area using the information of the radio wave measured by the mobile terminal. This radio wave state measurement system 10*b* is composed including a parameter update information reception means 101, a measurement control means 102, a measurement result reception means 103, a radio wave state DB 104, a measurement area identification means 105*a*, and a radio wave propagation simulator 1000. Although the parameter update information reception means 101 has the similar function as the first illustrative embodiment, in this illustrative embodiment, the radio parameter information to transmit includes at least the identification number of the base station to be updated, a type of the radio parameter to update, a value of the radio parameter before and after update, and date and time when the radio parameter is updated.

Although the measurement control means 102 has the similar functions as the first illustrative embodiment, it includes a function to provide area information identified by the measurement area identification means 105*a*. Note that the area information provided here can be the one that specifies a rectangular area and provides coordinates of a southwest end and a northwest end, the one that specifies a circular area and provides a central coordinate and a radius, or the one that specifies a polygonal area and provides coordinates or each vertex. Further, those coordinates can be either of latitude and longitude or rectangular coordinates. The measurement result reception means 103 and the radio wave state DB 104 have the similar functions as the first illustrative embodiment.

The radio wave propagation simulator 1000 is composed including a radio wave state estimation means 1001, a map DB 1002, and a base station DB 1003. Necessary data for performing radio wave propagation simulation such as a mesh and polygon data representing an altitude, polygon data representing feature information such as buildings, a mesh or polygon data representing land use distribution is stored to the map DB 1002. It is preferable that information of height (or floor number) is included in the feature information in order to perform highly accurate simulation. The base station DB 1003 stores necessary parameters for performing the radio wave propagation simulation such as the identification information of the base station, latitude and longitude (or rectangular coordinates) of a locating position, an altitude (or surface height), a transmission output, and a direction and an angle of attack of an antenna, and an antenna gain pattern.

The radio wave state estimation means 1001 includes a function to perform the radio wave propagation simulation from the base station 30*b* or a surrounding base station, in which the radio parameter thereof is to be updated. Specifically, the radio wave state estimation means 1001 extracts map data near the base station (for example, within the range of 5 km from the base station) from the map DB 1002, obtains detailed information of the base station from the base station DB 1003 and the radio parameter update information, and estimates the radio wave state before and after the radio parameter update. Since the date and time of the radio parameter update is received by the parameter update information reception means 101 and included in the stored radio parameter update information, it is possible to estimate the radio wave state before and after the radio parameter update.

For the estimation of the radio wave state, the existing statistical methods, such as the Okumura-Hata model, can be used, or the existing deterministic approach such as the ray tracing method can be used. Further, in a part or all of areas to perform the radio wave propagation simulation, correction using the measured data can be performed. Note that the details of the Okumura-Hata model and the ray-tracing method are respectively disclosed in NPL 1 and 2. Additionally, an example of the correction method using the measured data is disclosed in PTL 3.

The measurement area identification means 105*a* includes a function for identifying an area to perform the measurement according to the estimation result of the radio wave state by the radio wave state estimation means 1001. Specifically, the estimation result before the radio parameter update is compared with the estimation result after update, and an area expected that the communication quality deteriorates by a predetermined level or more shall be a measurement area. Moreover, an area expected that the communication quality improves by the predetermined level or more can be added to the measurement area.

The base station control system 20*b* is composed including the radio parameter control means 201 and the parameter update information transmission means 202, and each has respectively the similar function as the first illustrative embodiment.

The base station 30b is composed including the radio parameter update means 301, the measurement indication signal transmission means 302, and the measurement result transmission means 303. The radio parameter update means 301 and the measurement result transmission means 303 have the similar functions as the first illustrative embodiment. Although the measurement indication signal transmission means 302 also has the similar function as the first illustrative embodiment, according to the control from the measurement control means 102 of the radio wave state measurement system 10b, the information of the measurement area is added to the measurement indication signal.

The mobile terminal 40b is composed including the radio wave state measurement means 401 and a positioning means 402. Although the radio wave state measurement means 401 has the similar function as the first illustrative embodiment, according to the measurement indication signal transmitted from the measurement indication signal transmission means 302, the measurement is performed only when the current position of an own terminal is inside the measurement area and the measurement result is reported to the base station 30b. The positioning means 402 includes a function for measuring the current position of a terminal, and can include a GPS terminal, for example.

Figure 6:
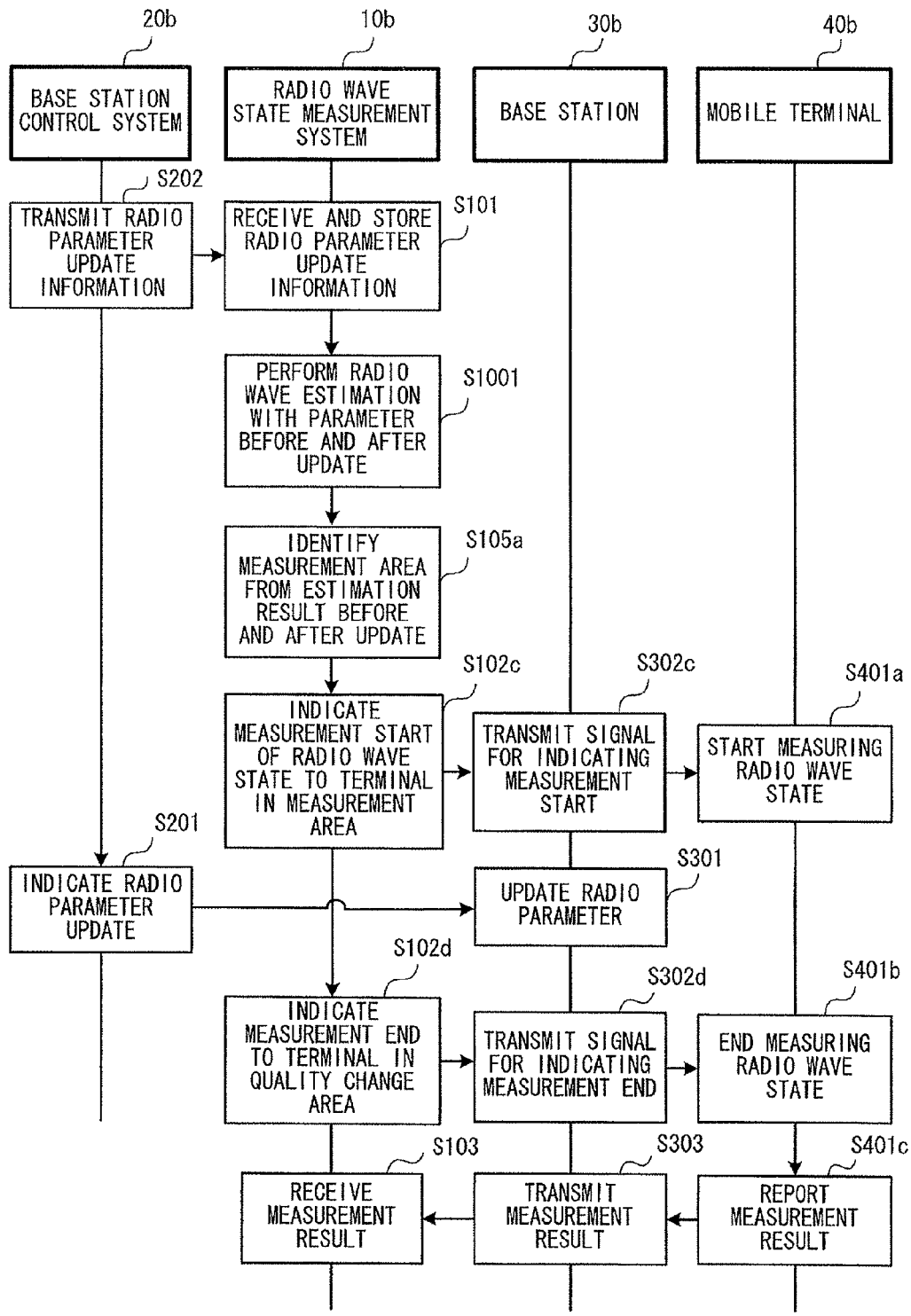
FIG. 6 is a flowchart for explaining an operation of the second illustrative embodiment.

FIG. 6 is a flowchart showing an operation of the second illustrative embodiment in which an entire configuration thereof is shown in FIG. 2. In FIG. 6, each sequence following the base station control system 20b, the radio wave state measurement system 10b, the base station 30b, and the mobile terminal 40b represents the operation in the system. Here, based on the operation shown in FIG. 4 of the first illustrative embodiment, explanation of the differences from this is focused.

The transmission (step S202) of the radio parameter update information from the base station control system 20b and the reception (step S101) by the radio wave state measurement system 10b is similar to that of the first illustrative embodiment. In this illustrative embodiment, after that, the radio wave state estimation means 1001 estimates the radio wave state before and after the radio parameter update with reference to the radio parameter update information received in the step S101 (step S1001). Further, the estimation result before and after the radio parameter update obtained in the step S1001 are compared, and an area expected that the communication quality deteriorates or improves by the predetermined level or more is identified as the measurement area (step S105a). The subsequent process from the indication (step S102c) of the measurement start by the radio wave state measurement system 10b to the reception of the measurement result and the storage (step S103) to the radio wave state DB 104 is the similar to the process (FIG. 4) of the first illustrative embodiment. However, the measurement of the radio wave state is performed only to the mobile terminal in the measurement area identified in the step S105a. Specifically in the measurement indication by the radio wave state measurement system 10b, the information of the measurement area is provided. In the base station 30b, when indicating the start and end of the measurement to the mobile terminal, the information concerning the measurement area is included in the measurement indication signal, and only when the current position of the mobile terminal is inside the measurement area, the measurement is executed.

Note that in the abovementioned operation explanation performed with reference to the flowchart of FIG. 6, it is the configuration that the radio wave state is estimated after the radio parameter update information is provided, however in the illustrative embodiment of FIG. 5, the radio parameter to be updated is limited, and when it is possible to calculate all the changing patterns and store them to the database beforehand, it can be such configuration. In such a configuration, since the step S1001 is executed beforehand, it is not necessary as the process after the radio parameter update information is provided.

Moreover, in the illustrative embodiment of FIG. 5, based on the operation shown in FIG. 4 of the first illustrative embodiment, the estimation (step S1001) of the radio wave state and the identification (step S105a) of the measurement area is added, and in a similar manner, based on the operation shown in FIGS. 2, 3A and 3B, it can be the operation to add the above two steps. This applies to the following illustrative embodiment.

According to this illustrative embodiment, the radio wave state before and after the radio parameter update is estimated, and by the comparison between them, an area expected of a large change of the radio wave state is identified as the measurement area. Then, it is possible to limit the area to perform the measurement, and efficiently measure the change of the radio wave state by the radio parameter update better than the first illustrative embodiment.

Third Illustrative Embodiment

Figure 7:
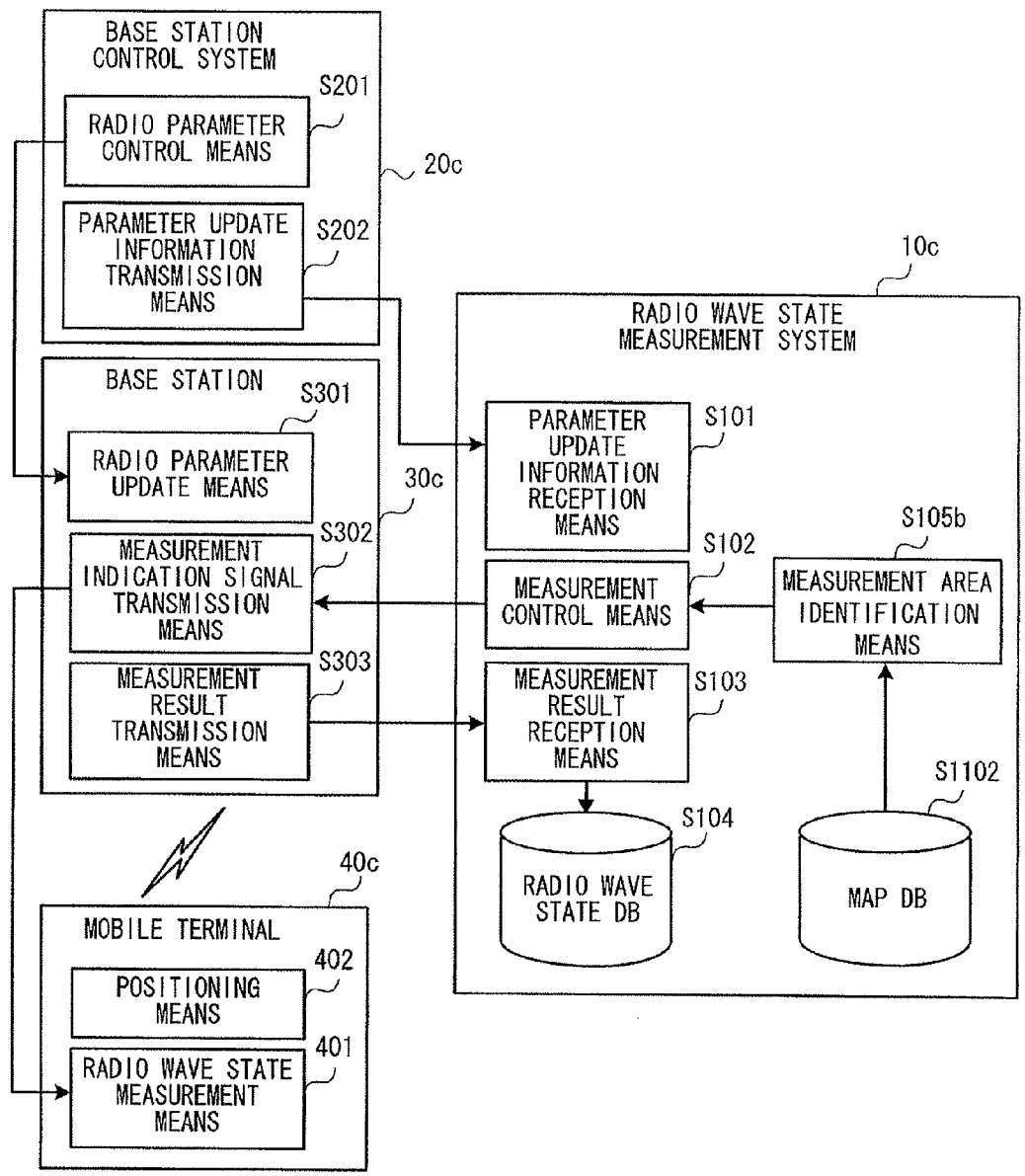
FIG. 7 is an entire block diagram for explaining a third illustrative embodiment of the present invention.

FIG. 7 is an entire block diagram showing a third illustrative embodiment of the present invention. As for 10c, a radio wave state measurement system is shown, 20c shows a base station control system, 30c shows a base station, and 40c shows a mobile terminal. Here, explanation of the difference from the second illustrative embodiment shown in FIG. 5 is focused. Hereinafter, a radio wave state measurement system and a radio wave state measurement method by this radio wave state measurement system, which are the third illustrative embodiment of the present invention, are explained with reference to FIGS. 7 and 8.

The radio wave state measurement system 10c is a system targeted of the present invention, and is a system for measuring the radio wave state of a service area using the information of the radio wave measured by a mobile terminal. The radio wave state measurement system 10c is composed including the parameter update information reception means 101, the measurement control means 102, the measurement result reception means 103, the radio wave state DB 104, a measurement area identification means 105b, and a map DB 1102. Each of the parameter update information reception means 101, the measurement control means 102, the measurement result reception means 103, and the radio wave state DB 104 has the similar function as the second illustrative embodiment.

A mesh or polygon data or the like representing land use distribution is stored to the map DB 1102. Otherwise, polygon or line data representing a building can be stored to the map DB 1102. It is preferable that the data concerning each building includes information of attributes (an office building, a commercial building, an apartment, a single-family home, etc.). With reference to the map DB 1102, the measurement area identification means 105b extracts the commercial building that is highly public, an office building and an apartment in which many users can be expected are extracted as the measurement area.

The base station control system 20c is composed including the radio parameter control means 201 and the parameter update information transmission means 202, and each respectively has the similar function as the second illustrative embodiment. The base station 30c is composed including the radio parameter update means 301, the measurement indication signal transmission means 302, and the measurement result transmission means 303, and each respectively has the similar function as the second illustrative embodiment. The mobile terminal 40c is composed including the radio wave state measurement means 401 and the positioning means 402, and each respectively has the similar function as the second illustrative embodiment.

Figure 8:
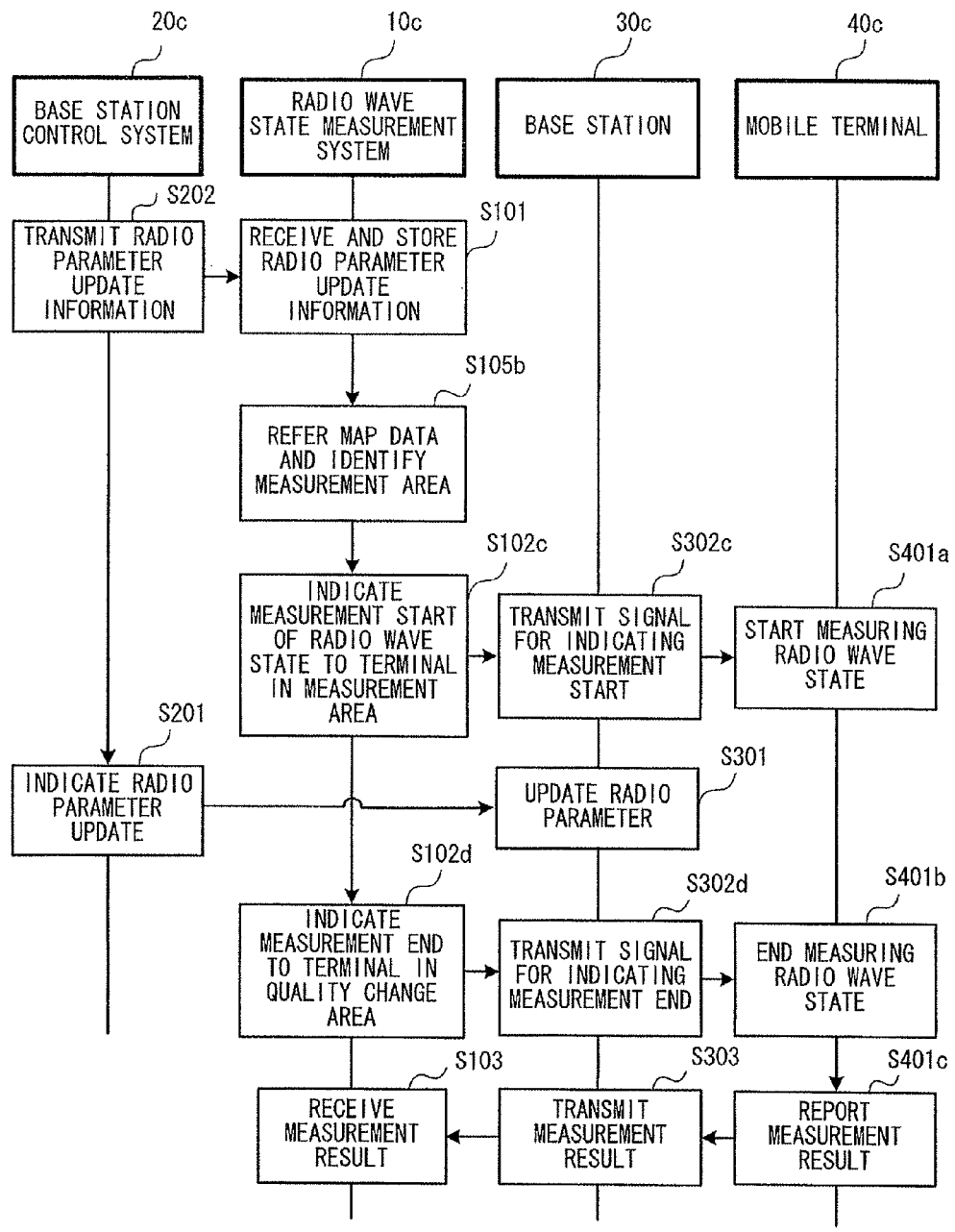
FIG. 8 is a flowchart for explaining an operation of the third illustrative embodiment of the present invention.

FIG. 8 is a flowchart showing an operation of the third illustrative embodiment (FIG. 7). In FIG. 8, each sequence following the base station control system 20c, the radio wave state measurement system 10c, the base station 30c, and the mobile terminal 40c represents the operation in the system. Here, explanation of the difference from the operation of the second illustrative embodiment shown in FIG. 5 is focused.

In the flowchart of FIG. 8 showing the operation of the illustrative embodiment of FIG. 7, instead of the steps S1001 and S105a in the flowchart of FIG. 6 showing the operation of the second illustrative embodiment (FIG. 5), an operation (step S105b) is added for extracting the commercial building with a high public nature, and the office building and apartment in which many users can be expected as the measurement area with reference to the map DB 1102.

Note that although in the flowchart of FIG. 8, the step S105b is performed after the radio parameter update information is provided, the illustrative embodiment of FIG. 7 can be enforced by the configuration in which the measurement areas are extracted beforehand for all the areas in the map DB 1102, and in the step S105b, the measurement area around the base station 30c is further extracted among the measurement areas extracted beforehand.

Additionally, by combining the illustrative embodiment of FIG. 7 and the above second illustrative embodiment (FIG. 5), (A) an area in which a large change can be expected in the radio wave state, and also (B) an area with a high public nature or expected heavy traffic can be extracted as the measurement area, or either of the area (A) or (B) can be extracted as the measurement area.

According to the illustrative embodiment of FIG. 7, an area with a high public nature and an area in which heavy traffic can be expected is identified as the measurement are from the map data. Accordingly, the illustrative embodiment of FIG. 7 can limit the area to perform the measurement, and it is possible to efficiently measure the change of the radio wave state by the radio parameter update more efficiently than the first illustrative embodiment.

The specific illustrative embodiments of the radio wave measurement system and the radio wave state measurement method by this radio wave state measurement system are explained above with reference to the drawings. As can be clearly seen from the flowcharts of FIGS. 2 to 4, and 6 and 8, the radio wave state measurement system and the radio wave state measuring method in these illustrative embodiments can be realized by a computer. The flowcharts of FIGS. 2 to 4 according to the first illustrative embodiment and the flowchart of FIG. 6 according to the second illustrative embodiment, and the flowchart of FIG. 8 according to the third illustrative embodiment respectively show the illustrative embodiments of the radio wave state measurement program of the present invention.

In this case, the computer program can be recorded on a recording medium to be provided, and moreover, it can be transmitted via the Internet and other communication medium to be provided. Further, the storage medium includes, for example, flexible disks, hard disks, magnetic disks, magneto-optical discs, CD-ROM, DVD, ROM cartridges, RAM memory cartridges with a battery back-up, flash memory cartridges, and nonvolatile RAM cartridges. Furthermore, the communication medium includes wired communication media such as telephone lines, and wireless communication media such as microwave lines.

As mentioned above, although the present invention is explained with reference to the illustrative embodiment, the present invention is not limited by the above. Various modifications understood by a person skilled in the art can be made within the scope of the invention.

The present application claims priority rights of and is based on Japanese Patent Application No. 2009-085802 filed on Mar. 31, 2009 in the Japanese Patent Office, the entire contents of which are hereby incorporated by reference.

INDUSTRIAL APPLICABILITY

According to the present invention, it can be utilized to usages such as the measurement of the radio wave state of a service area in a mobile communication system including a mobile phone. Especially it can be utilized to usages to quickly and efficiently perform the change of the radio wave state along with the radio parameter update when adjusting the radio parameter such as the transmission signal output of the base station and the antenna tilt so as to correspond to construction and demolition of buildings and an increase in the number of users.

REFERENCE SIGNS LIST 10a, 10b, 10c RADIO WAVE STATE MEASUREMENT SYSTEM
20a, 20b, 20c BASE STATION CONTROL SYSTEM
30a, 30b, 30c BASE STATION
40a, 40b, 40c MOBILE TERMINAL
101 PARAMETER UPDATE INFORMATION RECEPTION MEANS
102 MEASUREMENT CONTROL MEANS
103 MEASUREMENT RESULT RECEPTION MEANS
104 RADIO WAVE STATE DB
105a and 105b MEASUREMENT AREA IDENTIFICATION MEANS
1000 RADIO WAVE PROPAGATION SIMULATOR
1001 RADIO WAVE STATE ESTIMATION MEANS
1002 MAP DB
1102 MAP DB
1003 BASE STATION DB
201 RADIO PARAMETER CONTROL MEANS
202 PARAMETER UPDATE INFORMATION TRANSMISSION MEANS
301 RADIO PARAMETER UPDATE MEANS
302 MEASUREMENT INDICATION SIGNAL TRANSMISSION MEANS
303 MEASUREMENT RESULT TRANSMISSION MEANS
401 RADIO WAVE STATE MEASUREMENT MEANS

What is claimed is:

1. A radio wave state measurement system comprising:
a storage unit configured to store a time when a radio parameter of a base station is updated, before the radio parameter is actually updated; and
an instruction unit configured to instruct a mobile terminal, which is in communication with the base station, to measure a radio wave state corresponding to the base station at a timing according to the stored time, wherein the instruction unit is configured to limit an area in which the measurement of the radio wave state is performed by referring to an estimated radio wave state, which is estimate as respective radio wave state that occurs either before or after the radio parameter is updated, wherein the instruction unit is configured to compare the estimated radio wave state before the radio parameter is updated to the estimated radio wave state after the radio para is updated, wherein the instruction unit is configured to extract an area in which the estimated radio wave state after the radio parameter is updated deteriorates more than a predetermined degree as compared to the estimated radio wave state before the radio parameter is updated, as a radio wave state deteriorated area, and wherein the instruction unit is configured to make the mobile terminal located inside the radio wave state deteriorated area perform the measurement of the radio wave state.

2. The radio wave state measurement system according to claim 1, wherein the instruction unit is configured to make the mobile terminal perform the measurement of the radio wave state for a predetermined period that occurs either before or after the time when the radio parameter is updated.

3. The radio wave state measurement system according to claim 1, wherein the estimated radio wave state includes at least a radio wave state of a peripheral area of the base station.

4. The radio wave state measurement system according to claim 1, further comprising an estimating unit configured to provide the estimated radio wave state to the instruction unit.

5. The radio wave state measurement system according to claim 1, further comprising a database configured to store a radio wave state which was previously estimated regarding the base station, wherein the previously estimated radio state and the estimated radio state correspond to radio parameters that are different from each other, and wherein the instruction unit is configured to obtain the previously estimated radio wave state from the database.

6. The radio wave state measurement system according to claim 1, wherein the instruction unit is configured to store map data of a peripheral area of the base station, wherein the instruction unit is configured to extract at least one of an area with a highly public nature and an area of expected heavy traffic as a focus area from the stored map data, and wherein the instruction unit is configured to make the mobile terminal located inside the focus area perform the measurement of the radio wave state.

7. The radio wave state measurement system according to claim 1, wherein the radio parameter includes at least one of a total transmission power, a common pilot channel transmission power, a direction of an antenna, an angle of attack of the antenna, an adjacent cell list, and a hand-over threshold regarding the base station.

8. A radio wave state measurement method comprising:

storing a time when a radio parameter of a base station is updated, before the radio parameter is actually updated;

instructing a mobile terminal, which is in communication with the base station, to measure a radio wave state corresponding to the base station at a timing according to the stored time;

limiting an area in which the measurement of the radio wave state is performed by referring to an estimated radio wave state, which is estimated as a respective radio wave state that occurs either before or after the radio parameter is updated;

comparing the estimated radio wave state before the radio parameter is updated to the estimated radio wave state after the radio parameter is updated;

extracting an area in which the estimated radio wave state after the radio parameter is updated deteriorates more than a predetermined degree as compared to the estimated radio wave state before the radio parameter is updated, as a radio wave state deteriorated area; and making the mobile terminal located inside the radio wave state deteriorated area perform the measurement of the radio wave state.

9. The radio wave state measurement method according to claim 8, further comprising making the mobile terminal perform the measurement of the radio wave state for a predetermined period that occurs either before or after the time when the radio parameter is updated.

10. The radio wave state measurement method according to claim 8, wherein the estimated radio wave state includes at least a radio wave state of a peripheral area of the base station.

11. The radio wave state measurement method according to claim 8, further comprising:

providing the estimated radio wave state by a radio wave state estimation unit, and obtaining the estimated radio wave state.

12. The radio wave state measurement method according to claim 8, wherein the radio wave state is obtained from a database that stores a radio wave state which was previously estimated regarding the base station, wherein the previously estimated radio state and the estimated radio state correspond to radio parameters that are different from each other.

13. The radio wave state measurement method according to claim 8, further comprising:

extracting at least one of an area with a highly public nature and an area of expected heavy traffic as a focus area from map data of a peripheral area of the base station; and making the mobile terminal located in the focus area perform the measurement of the radio wave state.

14. The radio wave state measurement method according to claim 8, wherein the radio parameter includes at least one of a total transmission power, a common pilot channel transmission power, a direction of an antenna, an angle of attack of the antenna, an adjacent cell list, and a hand-over threshold regarding the base station.

15. A non-transitory computer-readable information recording medium storing a program which, when executed by a processor, performs a method comprising:

storing a time when a radio parameter of a base station is updated, before the radio parameter is actually updated;

instructing a mobile terminal, which is in communication with the base station, to measure a radio wave state corresponding to the base station at a timing according to the stored time;

limiting an area in which the measurement of the radio wave state is performed by referring to an estimated radio wave state, which is estimated as a respective radio wave state that occurs either before or after the radio parameter is updated;

comparing the estimated radio wave state before the radio parameter is updated to the estimated radio wave state after the radio parameter is updated;

extracting an area in which the estimated radio wave state after the radio parameter is updated deteriorates more than a predetermined degree as compared to the estimated radio wave state before the radio parameter is updated, as a radio wave state deteriorated area; and making the mobile terminal located inside the radio wave state deteriorated area perform the measurement of the radio wave state.

16. The non-transitory computer-readable information recording medium according to claim 15, wherein the method further comprises making the mobile terminal perform the measurement of the radio wave state for a predetermined period that occurs either before or after the time when the radio parameter is updated.

* * * * *

UNITED STATES PATENT AND TRADEMARK OFFICE
CERTIFICATE OF CORRECTION

PATENT NO. : 8,855,623 B2  Page 1 of 1
APPLICATION NO. : 13/255472
DATED : October 7, 2014
INVENTOR(S) : Hiroto Sugahara It is certified that error appears in the above-identified patent and that said Letters Patent is hereby corrected as shown below:

In the Claims

Column 15, line 4: In Claim 1, delete "estimate as" and insert -- estimated as a --

Column 15, line 11: In Claim 1, delete "para" and insert -- parameter --

Signed and Sealed this
Seventeenth Day of March, 2015

Michelle K. Lee
*Director of the United States Patent and Trademark Office*